Aug. 25, 1953  E. P. KEATON  2,650,099
BOAT TRAILER
Filed Sept. 21, 1951  2 Sheets-Sheet 1
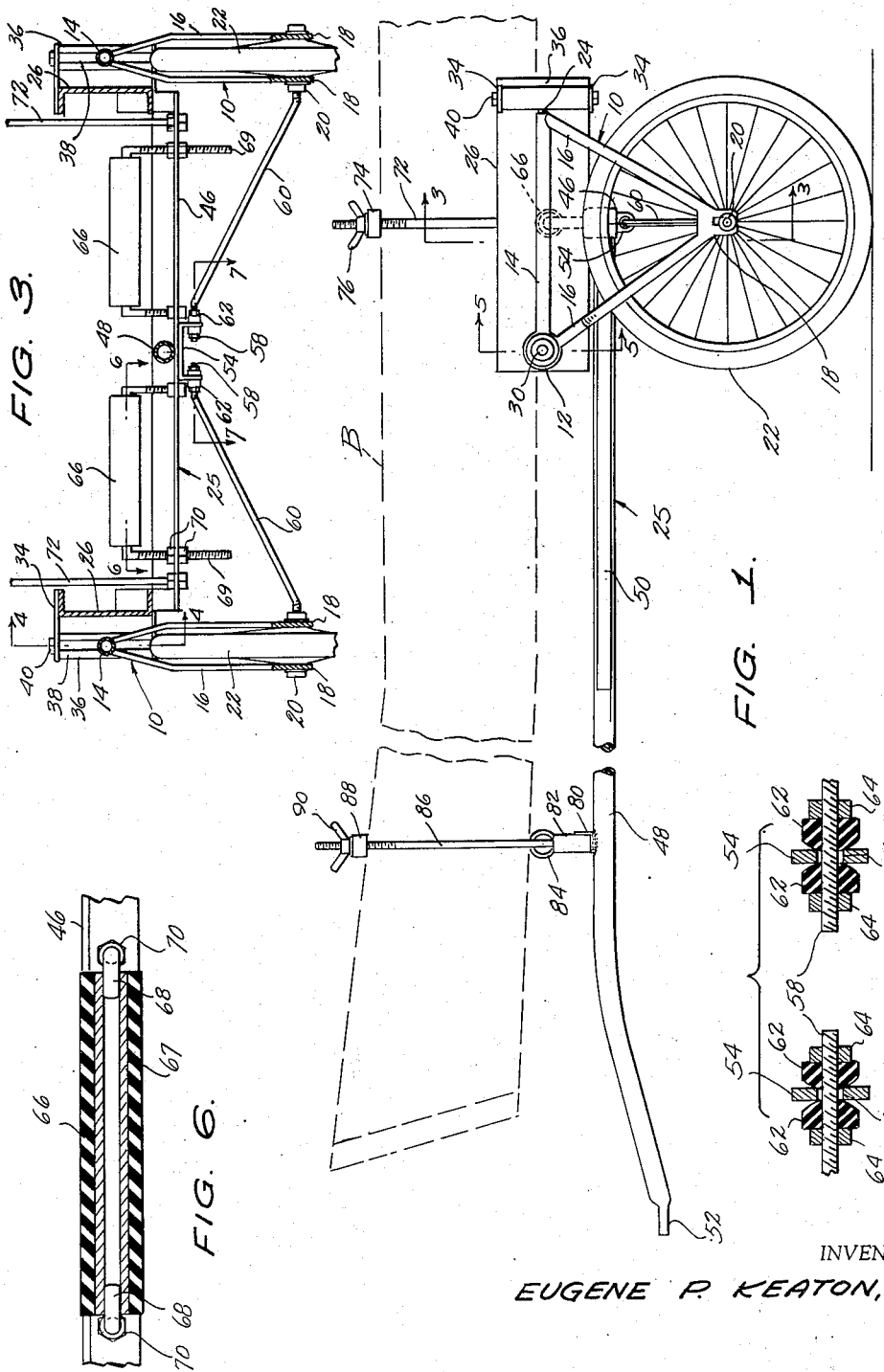
INVENTOR
EUGENE P. KEATON,
BY
McMorrow, Berman & Davidson
ATTORNEYS

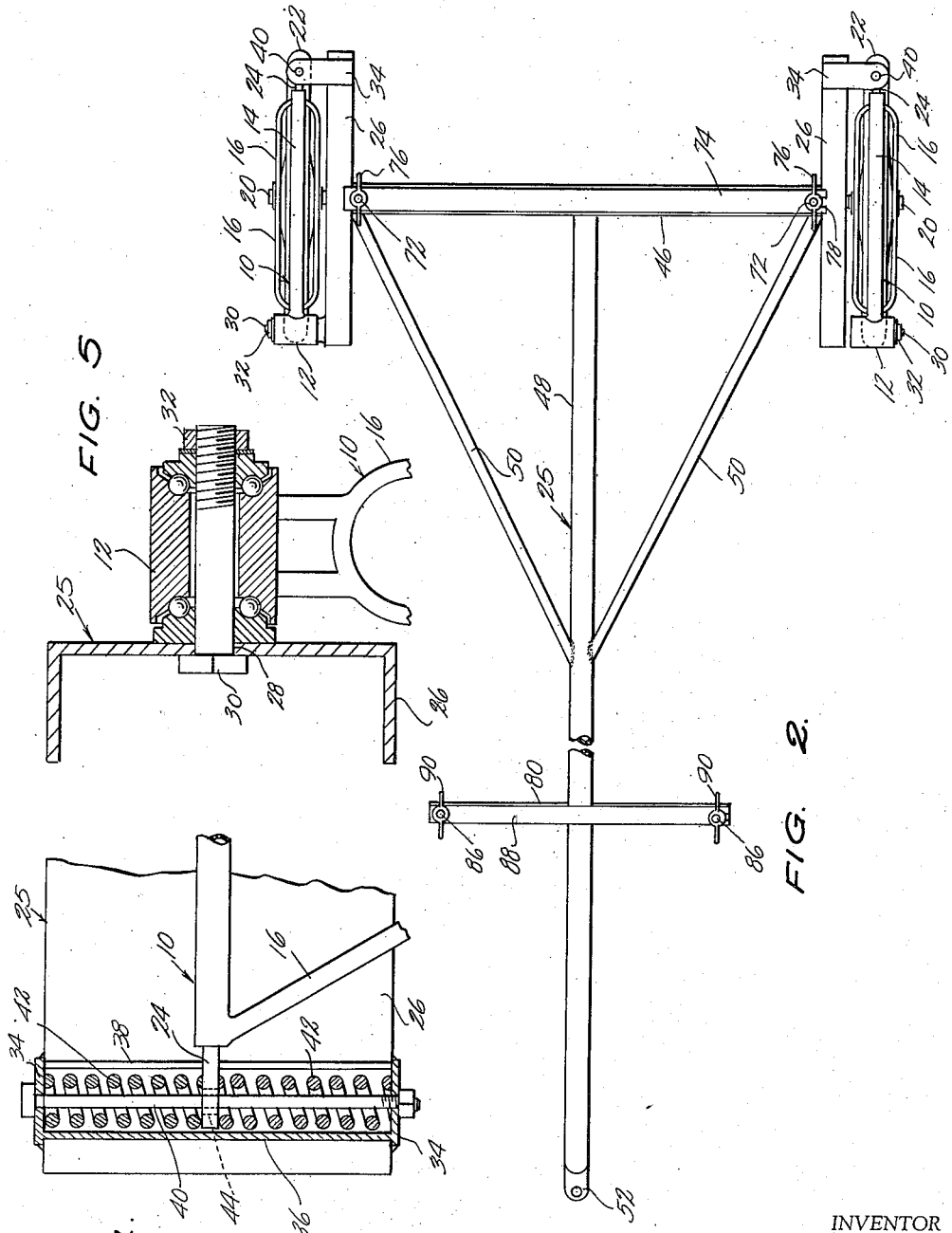

Patented Aug. 25, 1953

2,650,099

UNITED STATES PATENT OFFICE 2,650,099

BOAT TRAILER

Eugene P. Keaton, Andrews, S. C.

Application September 21, 1951, Serial No. 247,611

3 Claims. (Cl. 280—33.4)

1

This invention relates to trailer construction and more particularly, has reference to a boat trailer novelly designed in a manner to permit its construction, in part, from ordinarily discarded bicycle parts.

Old bicycle frames are often discarded and scrapped due to their being considered as being beyond repair. It is, accordingly, one important object of the present invention to provide a use for discarded bicycle parts of the nature described, by incorporation of said parts in a boat trailer, thus to permit the manufacture of the trailer at low cost.

Another important object is to provide a boat trailer in which discarded bicycle frame portions may be used, wherein said frame portions are so mounted upon the frame of the boat trailer as to provide a resilient, shock-absorbent support for a boat that will cushion considerably road shocks suffered while the boat is being drawn from place to place.

Yet another object is to provide a boat trailer of the type stated which, while being readily adapted for incorporation of discarded bicycle parts therein, is nevertheless equally well adapted for manufacture without use of said discarded parts, and will be light, compact, sturdy, and shock-absorbent whether or not the discarded parts of a bicycle is used.

Other objects will appear from the following description, the claims appended thereto, and from the annexed drawing, in which like reference characters designate like parts throughout the several views, and wherein:

Figure 1 is a side elevational view of a boat trailer formed in accordance with the present invention, a boat supported thereon being shown fragmentarily, in dotted lines;

Figure 2 is a top plan view;

Figure 3 is a transverse sectional view taken on line 3—3 of Figure 1;

Figure 4 is an enlarged sectional view showing the shock-absorbent mounting of the wheel supports, taken substantially on line 4—4 of Figure 3;

Figure 5 is an enlarged sectional view of the pivotal connections between the wheel supports and the trailer frame, taken substantially on line 5—5 of Figure 1;

Figure 6 is an enlarged longitudinal sectional view through one of the boat-supporting rollers, taken substantially on line 6—6 of Figure 3; and Figure 7 is an enlarged sectional view taken longitudinally through the inner connections of

2 the wheel support braces to the trailer frame, taken substantially on line 7—7 of Figure 3.

Referring to the drawings in detail, the invention includes a pair of transversely spaced wheel supports generally designated 10. These are of identical formation, and accordingly, the description for one will suffice for both.

Each wheel support 10 in the present instance comprises a part of a bicycle frame, and is formed by cutting a bicycle frame immediately in front of the sprocket bearing sleeve thereof, and immediately in front of the seat. As a result, a wheel support 10 of triangular shape is provided, having three substantially equidistant corner portions. When the triangular wheel support is applied to the boat trailer frame, two of said corner portions are aligned horizontally, longitudinally of the trailer, and may be conveniently termed the upper corner portions of the wheel support. The third corner portion is disposed below and is arranged medially between the upper corner portions, and will be hereinafter termed the lower corner portion.

That upper corner portion disposed toward the front of the boat trailer is formed with a horizontally extended bearing sleeve 12, and it will be readily understood that the bearing sleeve 12 in actuality is constituted by the conventionally formed sprocket shaft journal of the bicycle frame. Integral or otherwise rigid with the bearing sleeve 12 is a horizontal leg 14 of the triangular wheel support, and rigid with the bearing sleeve and with the other end of the leg 14 respectively are downwardly converging, bifurcated legs 16, the convergent ends of which are integral or otherwise rigid with a wheel fork 18, at the lower corner portion of the wheel support. A shaft 20 extends between the wheel forks 18 of the wheel support 10, for rotatable mounting of a ground-engaging wheel 22, here shown as a bicycle wheel, between the spaced arms of the respective bifurcated legs 16.

That upper portion of the wheel support disposed closest to the rear end of the trailer is provided with a short, rearwardly extended bar 24, which is rigidly mounted in the rear upper corner portion and which, in a bicycle, constitutes a portion of the seat support bar of the bicycle.

The respective wheel supports 10 are arranged along side the boat trailer frame, which has been generally designated 25, the wheel supports being disposed in vertical planes contiguous to a pair of parallel side frame members 26 that constitute part of the trailer frame 25, and which extend longitudinally of the boat trailer frame, at the rear end thereof.

The wheel supports 10 are pivotally mounted upon the respective side frame members 26, for swinging movement in vertical planes, and to this end, there is extended outwardly from each side frame member, at the front end thereof, a spindle extending through the bearing sleeve 12. The side frame member 26 (see Figure 5) is formed with an opening 28 through which the spindle 30 extends, the spindle being in the form of an elongated bolt threaded at its outer end to receive a nut 32 to prevent relative separation of the side frame member and bearing sleeve.

The side frame members 26, as readily seen from Figure 5, are of channeled formation, and upon the rear ends of the respective side frame members, I fixedly mount thereupon a pair of vertically spaced, laterally extended plates 34 between which extends a vertically positioned shock absorber sleeve 36. This construction is particularly well illustrated in Figure 4, and as may be noted, the shock absorber sleeve 36 is formed with a longitudinal slot 38 extending fully from end to end thereof, through which the bar 24 is extended.

Formed in the respective plates 34 are vertically aligned apertures, receiving a longitudinal bolt 40. A pair of longitudinally aligned coil springs 42 surround the bolt 40 and are arranged to abut at one end against opposite sides of the bar 24. The bar 24, in this connection, is formed with an opening 44 of substantially greater diameter than the bolt 40, so as to be allowed a limited amount of travel through an arcuate path, longitudinally of said bolt.

In this way, the rear corner portion of the wheel support 10 is in effect extended into the slotted sleeve 36, and is free to be shifted in opposite directions longitudinally of and within said sleeve, the bar 24 being considered as a part of said rear corner portion. The respective springs 42 limit movement of said rear corner portion in opposite directions, and provide a cushioning means adapted to absorb road shocks during the movement of the boat trailer.

A cross member 46 constitutes part of the trailer frame 25, and extends transversely between the respective side frame members 26, and is rigidly connected at opposite ends to the under sides of said side frame members. The cross member 46 may be of angle iron or channel formation, and medially between the opposite ends thereof, has a fixed connection to the rear end of an elongated tongue 48 formed of tubular stock, that is disposed longitudinally and centrally of the trailer, as best shown from Figure 2. The tongue 48 also constitutes part of the trailer frame, and is braced in its proper position through the provision of a pair of tongue braces 50, that converge toward the front end of the trailer, and are secured rigidly at opposite ends to the tongue and cross member respectively.

At its front end, the tongue 48 is provided with a flattened, apertured extension 52, whereby the trailer may be hitched in a conventional manner to an ordinary trailer hitch mounted upon the rear end of an automobile or other traction vehicle, not shown.

Secured rigidly to the cross member 46 intermediate opposite ends thereof, and underlying said cross member, is a U-shaped supporting bracket 54 having spaced, downturned ends respectively formed with transversely aligned openings 56 receiving the coaxial, threaded inner ends 58 of angularly related wheel support braces 60. The openings 56 are substantially of greater diameter than the diameter of the ends 58 of the wheel support braces, so as to allow said wheel support braces a limited amount of up and down movement within said openings. This is necessary because, during movement of the trailer over a road surface, road shocks suffered by the trailer will cause limited up and down pivotal movement of the wheel supports. Since the outer ends of the wheel support braces 60 are threaded and secured threadably to the shafts 20 of the ground wheels 22, it is necessary that the inner ends of the braces 60 be permitted a certain amount of pivotal movement relative to the cross member 46 to which they are attached.

To cushion the slight pivotal movement of the inner ends 58 of the braces 60, I provide a pair of rubber washers 62 mounted upon said inner ends 58 at opposite sides of the opening 56 of the bracket (Figure 7). Nuts 64 are threaded upon the ends 58 against the respective washers 62.

Referring now to Figures 3 and 6, rear rollers 66 are provided, above the cross member 46, for supporting a boat B during movement of the trailer from place to place, and are operative to permit the boat to be positioned upon or removed from the trailer with maximum facility. As readily seen from Figure 6, each roller 66 comprises an exterior covering of soft rubber or similar material, and a tubular core 67. Extended into opposite ends of the core 67 are lateral fingers 68 formed upon the upper ends of upstanding, threaded rods 69, that extend through suitable openings formed in and spaced longitudinally of the cross member 46, and are held in place by opposed lock nuts 70. It will be readily appreciated that by loosening the nuts 70, the rollers 66 can be adjusted upwardly or downwardly relative to the cross member 46 upon which they are mounted, to selected positions, after which the lock nuts are readily tightened to retain the rollers at the selected levels of elevation.

For the purpose of holding the boat B against movement relative to the trailer frame, I provide upstanding clamping rods 72, that are rigidly secured at their lower ends to the opposite end portions of the cross member 46, and extend substantial distances thereabove. The rods 72 are so disposed as to extend upwardly along opposite sides of the boat B, and extending transversely of the trailer frame and mounted at opposite ends upon the rods 72, is a clamping bar 74. Wing nuts 76 are threaded upon the respective rods 72, and when threaded downwardly upon said rods, force the clamping bar 74 against the boat, so as to securely hold the boat against movement relative to the trailer frame.

As seen from Figure 2, one end of the clamping bar 74 is provided with a slot 78 receiving the adjacent clamping rod 72, so as to permit the clamping bar to be removed entirely from the rod 72, and swung out of position whenever the boat B is being loaded upon or unloaded from the trailer.

For the purpose of supporting the front end of the boat B, I provide a cross piece 80, welded or otherwise rigidly secured to the forward end portion of the tongue 48, and having fixedly mounted upon opposite ends thereof upstanding brackets 82. A front support bar 84 is supported at its ends upon the bracket 82. Clamp rods 86, extending through the ends of bar 84, are secured at their lower ends to the brackets 82, and at their upper ends support opposite ends of a front clamping bar 88, that is adapted to bear against the front end portion of the boat B, thus to cooperate with the clamping bar 74 in holding the boat immovably upon the trailer frame. The clamping bar 88, like the clamping bar 74, is formed at one end with a slot receiving the adjacent bolt or rod 86, so as to be capable of being swung out of the way whenever desired. Wing nuts 90 are threaded upon the clamping rods 86, and bear against the opposite end portions of the bar 88.

I believe that it will be readily apparent that a trailer formed as illustrated and described above will be quite light in weight, and will yet be compact and sturdy. An important characteristic of the trailer is the fact that it is readily adapted for manufacture from discarded bicycle frames, which when mounted upon the trailer frame in the manner described, constitute shock-absorbent supports for the trailer frame, and are effective to cushion a supported boat against normal road shocks encountered during movement of the trailer from place to place.

It is believed clear that the invention is not necessarily confined to these specific use or uses thereof described above, since it may be utilized for any purpose to which it may be suited. Nor is the invention to be necessarily limited to the specific construction as illustrated and described, since such construction is only intended to be illustrative of the principles of operation and the means presently devised to carry out said principles, it being considered that the invention comprehends any minor changes in construction that may be permitted within the scope of the appended claims.

What is claimed is:

1. In a boat trailer, a frame adapted for supporting a boat thereon, said frame including means at one end thereof for attachment to a traction vehicle, a transversely disposed cross member at its other end, and a pair of side frame members rigid with the opposite ends of the cross member; a pair of wheel supports arranged along side of the respective side frame members, each wheel support being proportioned to include a pair of horizontally aligned upper corner portions and a lower corner portion disposed below and equidistant from the upper corner portions; means pivotally connecting one upper corner portion of each support to the side frame member adjacent thereto; a ground wheel carried by the lower corner portion of each support; a sleeve rigid with each side frame member slotted to receive the other upper corner portion of said support, said other upper corner portion sliding endwise of and within said sleeve; a pair of springs arranged at opposite sides of said other upper corner portion within the sleeve and adapted to resiliently and cushionably limit endwise movement thereof within the sleeve; a pair of wheel support braces disposed transversely of the frame below the cross member thereof, each brace being connected at one end to the lower corner portion of a wheel support and being inclined upwardly from said one end thereof to terminate, at its other end, in closely spaced relation to the mid-length portion of the cross member, said other ends of the wheel support braces being spaced apart transversely of the frame below said mid-length portion of the cross member; a bracket of inverted U-shape secured to said mid-length portion of the cross member and having depending legs formed with openings loosely receiving said other ends of the respective wheel support braces, said wheel support braces having limited pivotal and endwise movement within the openings; and a pair of resilient washers circumposed about said other end of each brace and engaging opposite sides of the associated leg of the bracket to provide means cushionably limiting said pivotal and endwise movement of the braces.

2. In a boat trailer, a frame proportioned to support a boat thereon and including means at one end for attachment to a traction vehicle, a cross member at its other end, and side frame members rigid with the opposite ends of the cross member; wheel supports arranged along side the respective side frame members, each wheel support comprising the triangular rear frame element of a bicycle having a sprocket hub at one corner portion thereof, a seat support bar at a second corner portion thereof, said corner portions being aligned horizontally adjacent their associated side frame member, and a wheel fork at a third corner portion thereof spaced equidistantly from and below the first and second named corner portions, said third corner portion forming a lower corner portion on each wheel support; means pivotally connecting the first corner portion to the side frame member adjacent thereto for movement of the wheel support in a vertical plane; a ground wheel mounted rotatably upon the third corner portion of the wheel support; a sleeve rigid with each side frame member slotted to receive the second corner portion of the support, said second corner portion sliding endwise of and within the sleeve; a pair of springs arranged within the sleeve at opposite sides of the second corner portion and adapted to resiliently and cushionably limit pivotal movement of the wheel support in opposite directions; a pair of wheel support braces disposed transversely of the frame below the cross member thereof, each brace being connected at one end to the lower corner portion of a wheel support and being inclined upwardly from said one end thereof to terminate, at its other end, in closely spaced relation to the mid-length portion of the cross member, said other ends of the wheel support braces being spaced apart transversely of the frame below said mid-length portion of the cross member; a bracket of inverted U-shape secured to said mid-length portion of the cross member and having depending legs formed with openings loosely receiving said other ends of the respective wheel support braces, said wheel support braces having limited pivotal and endwise movement within the openings; and a pair of resilient washers circumposed about said other end of each brace and engaging opposite sides of the associated leg of the bracket to provide means cushionably limiting said pivotal and endwise movement of the braces.

3. In a boat trailer, a frame proportioned to support a boat thereon and including means at one end for attachment to a traction vehicle, a cross member at its other end, and side frame members rigid with the opposite ends of the cross member; wheel supports arranged alongside the respective side frame members, each wheel support comprising the triangular rear frame element of a bicycle having a sprocket hub at one corner portion thereof, a seat support bar at a second corner portion thereof, said corner portions being aligned horizontally adjacent their associated side frame member, and a wheel fork at a third corner portion thereof spaced equidistantly from and below the first and second named corner portions, said third corner portion forming a lower corner portion on each wheel support; means pivotally connecting the first corner portion to the side frame member adjacent thereto for movement of the wheel support in a vertical plane; a ground wheel mounted rotatably upon the third corner portion of the wheel support; a sleeve rigid with each side frame member slotted to receive the second corner portion of the support, said second corner portion sliding endwise of and within the sleeve; a pair of springs arranged within the sleeve at opposite sides of the second corner portion and adapted to resiliently and cushionably limit pivotal movement of the wheel support in opposite directions; a pair of wheel support braces disposed transversely of the frame below the cross member thereof, each brace being connected at one end to the lower corner portion of a wheel support and being inclined upwardly from said one end thereof to terminate, at its other end, in closely spaced relation to the mid-length portion of the cross member, said other ends of the wheel support braces being spaced apart transversely of the frame below said mid-length portion of the cross member; a bracket of inverted U-shaped secured to said mid-length portion of the cross member and having depending legs formed with openings loosely receiving said other ends of the respective wheel support braces, said wheel support braces having limited pivotal and endwise movement within the openings; and a pair of resilient washers circumposed about said other end of each brace and engaging opposite sides of the associated leg of the bracket to provide means cushionably limiting said pivotal and endwise movement of the braces.

EUGENE P. KEATON.

References Cited in the file of this patent
UNITED STATES PATENTS

| Number | Name | Date |
|---|---|---|
| 2,052,309 | Kovach | Aug. 25, 1936 |
| 1,160,608 | Watson | May 30, 1939 |
| 2,322,785 | Knox | June 29, 1943 |
| 2,442,248 | Sampsell | May 25, 1948 |
| 2,448,443 | Krake | Aug. 31, 1948 |
| 2,549,320 | Makin | Apr. 17, 1951 |